UNITED STATES PATENT OFFICE.

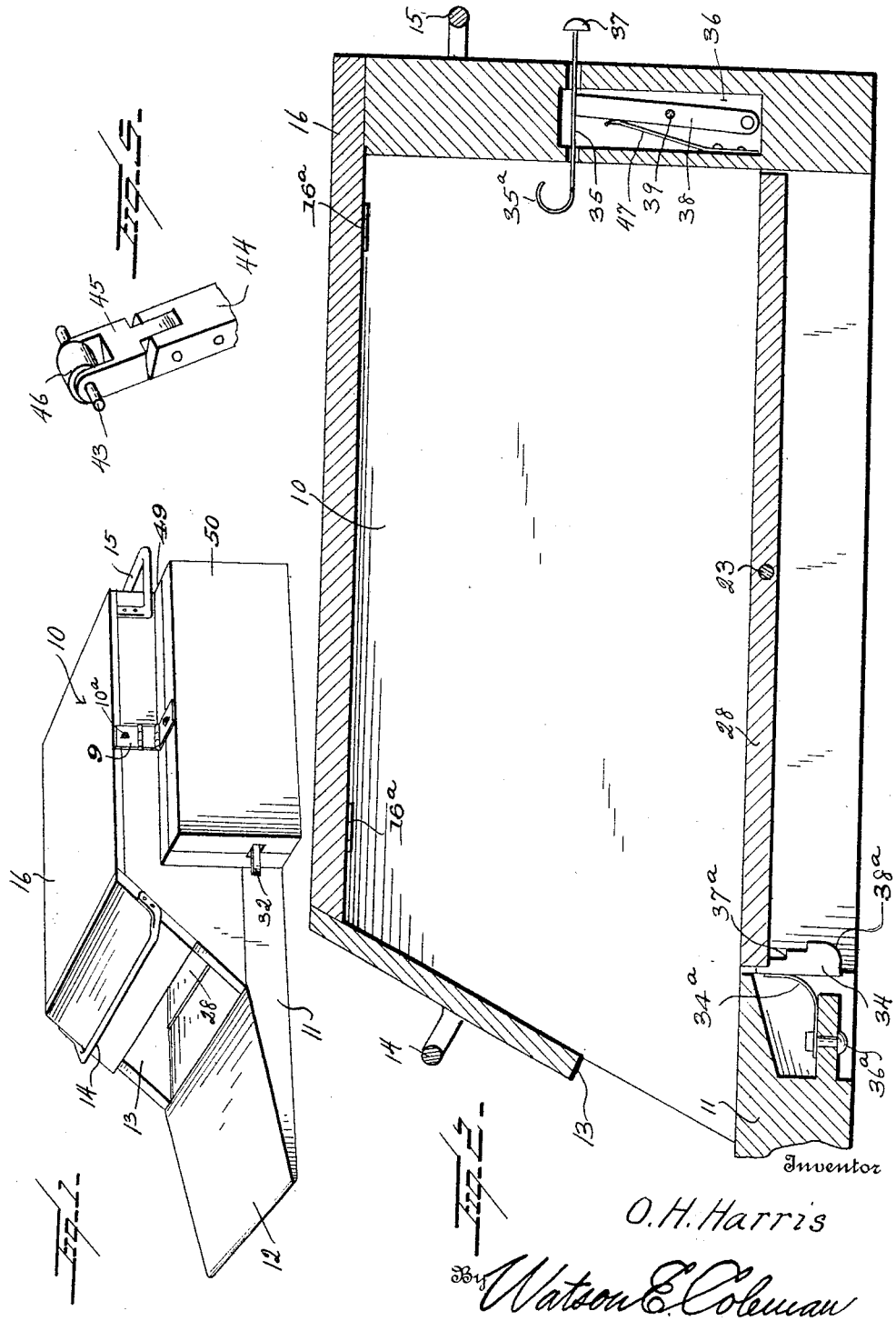

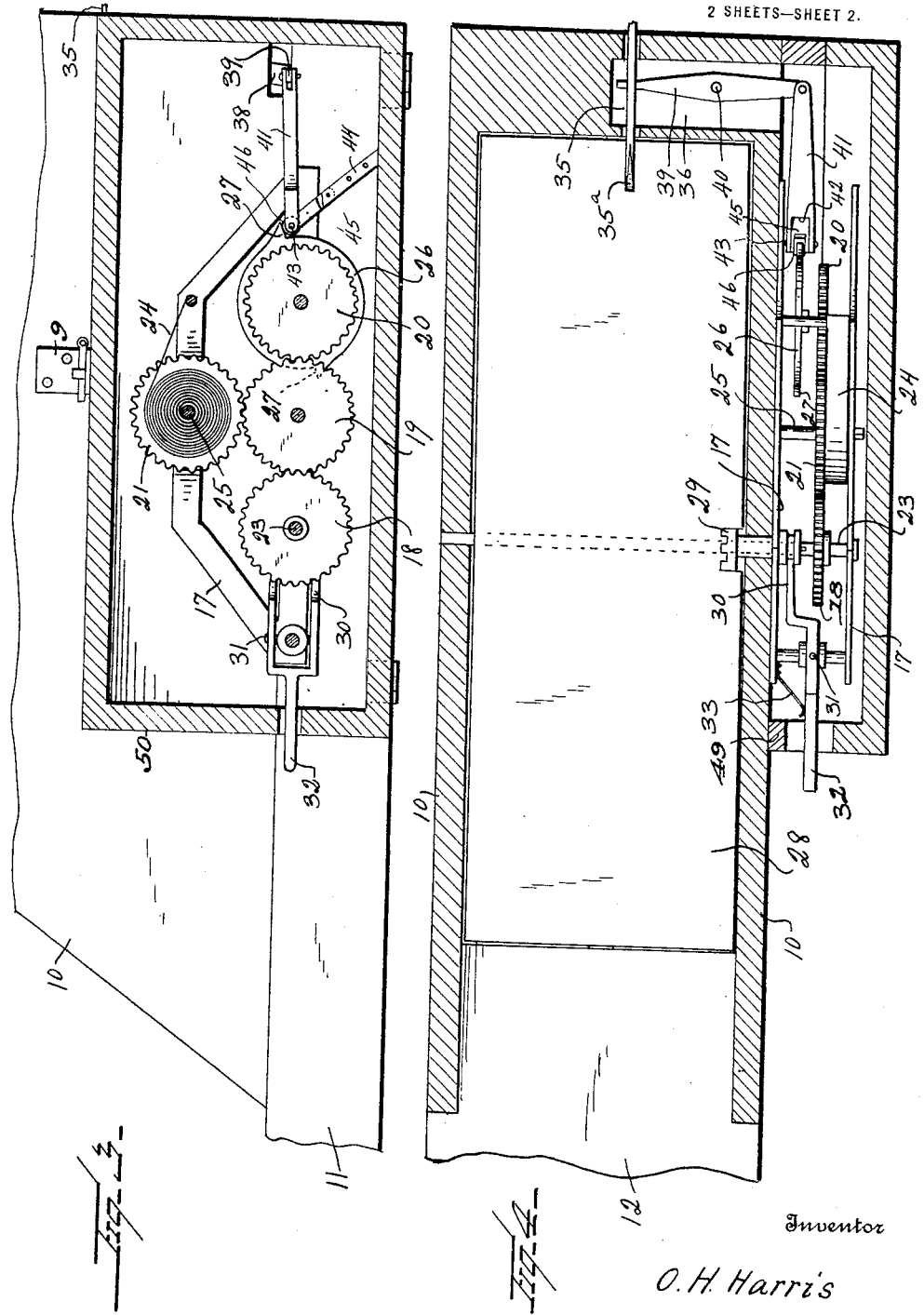

OLIVER H. HARRIS, OF MORO, ARKANSAS.

TRAP.

1,404,606.   Specification of Letters Patent.   Patented Jan. 24, 1922.

Application filed May 23, 1921. Serial No. 471,658.

*To all whom it may concern:*

Be it known that I, OLIVER HENRY HARRIS, a citizen of the United States, residing at Moro, in the county of Lee and State of Arkansas, have invented certain new and useful Improvements in Traps, of which the following is a specification, reference being had to the accompanying drawings.

This invention relates to traps, and particularly to that class of traps wherein the bottom of the trap is formed by a trap door normally held in a closed or horizontal position and having a latch holding the trap door in its horizontal position and released by the pull of an animal on the bait, the trap being adapted to be disposed over a tank of water so that when an animal pulls at the bait, the trap door will be released and will discharge the animal into the water.

The general object of the present invention is to provide an improved trap of this type wherein the trap door is rotated from its set horizontal position to discharge the animal into the water and is also returned to its horizontal position by a spring, the spring being of such size and strength as that it will rotate the trap door a number of times without rewinding, and means being provided whereby the trap door is automatically caught and held at each half rotation so that the trap automatically resets itself ready for the next animal.

A further object is to provide improved means for automatically rotating the door when released by the attack of the animal on the bait and improved means for releasing the latch holding the door from rotation.

And a further object is to provide means whereby the trap door may be, if desired, released from its engagement with the spring actuated rotating mechanism so as to permit the trap door to be rotated by hand when it is desired to clean out the trap or rebait the trap.

Other objects will appear in the course of the following description.

My invention is illustrated in the accompanying drawings, wherein:—

Figure 1 is a perspective view of my improved trap;

Figure 2 is a longitudinal sectional view thereof;

Figure 3 is a fragmentary side elevation thereof showing the casing enclosing the actuating mechanism, and the trapping mechanism released;

Figure 4 is a longitudinal sectional view, the trapping mechanism being in plan;

Figure 5 is a fragmentary perspective view of the pawl 45 and support 44.

Referring to these drawings, it will be seen that the trap consists of a hollow body or box 10 which is supported upon a base 11, this base projecting beyond the trap to form a runway 12. The front of the trap just above the base has an opening 13 and this front end of the trap is provided with a handle 14. The rear end of the trap is also provided with a handle 15 and the top of the trap is formed by a lid 16 hinged at 16$^a$ having means whereby it may be locked in place by locking the hasp 9 and staple 10$^a$. Disposed on the inside of the trap and adjacent one side wall thereof is a supporting frame, designated 17, which is made in any suitable manner, and this supporting frame carries upon it a train of four intermeshing wheels 18, 19, 20 and 21, the wheels 19 and 21 intermeshing with each other and the wheel 19 intermeshing with the wheels 18 and 20. The trap door is supported upon an axle 23 which extends through the side walls and is rotatably mounted therein, and this axle 23 is adapted to be operated by the wheel 18 through a clutch connection, as will be later described. The axle of the wheel 21 is operatively engaged by a coiled spring 24 which is attached at one end to any fixed part of the frame 17 and at its other end is connected to the axle of the wheel. The axle 25 of this wheel is formed so that a key may be applied thereto whereby the spring may be wound up. The wheel 20 carries in conjunction with it a ratchet wheel 26 formed with two teeth 27 diametrically disposed with relation to each other. This wheel 20 is, therefore, held from rotation under the action of the spring 24 by means of a latch or pawl released by the bait, as will be later described.

The bottom of the casing is formed by the trap door 28 which is loosely mounted upon the axle or shaft 23. This axle carries upon it a clutch 29 of any suitable character which is adapted to be shifted into engagement with the door 28 or when it is shifted away from the door to permit the door to stand still while the shaft 23 rotates. This shaft 23 carries the gear wheel 18, and the clutch 29 is adapted to be shifted into or out of engagement with the door 28 by means of the clutch shifting lever 30 which is pivoted at 31 and has a handle 32 extending outward or toward the front end of the trap. A spring 33 normally holds the clutch in engagement with the trap door 28, but by shifting the handle 32 against the action of the spring, the door may be released, as before stated.

For the purpose of holding the front end of the door from downward movement, I have provided a spring actuated detent or latch, designated 34, which is mounted upon a spring 34$^a$ held in place by a bolt 36$^a$, and this latch 34 being stepped upon its upper face, as at 37$^a$, and being rounded upon its lower face, as at 38$^a$. It will be obvious now that the trap door 28 cannot swing downward, as it rests upon one of the steps 37$^a$, but that as the trap door rotates in a clockwise direction, it will pass the lower face of the latch 34. In other words, this latch permits the trap door to rotate in a clockwise direction but prevents it rotating in a counter-clockwise direction. The means whereby the rotation of the ratchet wheel 26 is prevented until an animal attacks the bait contained in the trap may be of any suitable character but it includes a latch normally held in engagement with one of the ratchet teeth 27 and preventing a clockwise rotation of the wheel 20, bait carrying operating means for retracting the latch, and spring actuated means for causing the latch to fly back into a position of engagement with the next succeeding ratchet tooth upon the release of the bait so as to prevent the trap door from rotating more than a half revolution.

As illustrated, this mechanism comprises a rod 35 which extends through a chamber 36 formed in the rear end of the box or trap body, this rod being formed at one end with a hook 35$^a$ upon which the bait may be placed and a button 37 at its opposite end and upon the exterior of the trap. This rod 35 has depending from it an arm 38, which is pivotally supported at its lower end and pivotally engages one end of a lever 39 which is pivoted at 40. The outer end of this lever 39 is pivoted to a link 41 whose opposite end is bifurcated, as at 42, and carries a transversely extending pin 43. Pivoted to the upper bifurcated end of a support 44 is a small link 45 having a tongue engaging in the bifurcation of the support 44, the outer end of this link being bifurcated and fitting in the bifurcation of link 41. The pin 43 passes through the outer end of the link 45 and the outer end of the link 41 and pivots the two links together and carries upon it a roller 46. A spring 47 bears against the lever 38 and holds the bait hook in a retracted position and the roller 46 beneath the tooth 27 of the ratchet wheel 26. When the link 41 is retracted, it will withdraw the roller 46 from the tooth and permit the ratchet wheel to rotate in a counter-clockwise direction. The roller 46 will travel along the periphery of the ratchet wheel and the spring 47 will cause this roller to engage beneath the next succeeding tooth. The same release of the ratchet wheel 26 may be secured by pressing upon the button 37, which will act to shift the arm 38 and the lever 39 and release the trigger and permit the spring 24 to rotate the trap door 28 through half a revolution.

It will be seen that with this construction as soon as a rat enters the trap and nibbles at the bait, he will pull the bait, which will release the trigger, and this will permit the rotation of the ratchet wheel under the action of the spring 24 and the trap door will rotate through half a revolution, throwing the animal into the barrel of water upon which the trap is supported. After having completed a half revolution, the trap door is again in its horizontal position and locked in this position by the pawl 34 and by the engagement of the latching mechanism heretofore described with the ratchet 26, and the trap is again automatically set for another catch.

In actual operation, the spring 24 is sufficiently strong so as to give, say 15 rotations to the trap door before it has to be rewound. The actuating mechanism composed of the train of gear wheels 18 to 21 is enclosed within a casing 49, which includes a section 50 hinged to the base of the trap at 51, permitting this casing to be turned upward over the actuating mechanism and locked in position. This trap has been found thoroughly effective for such animals as rats, cats, squirrels, etc., and it is obvious that it may be made of any desired size, however, for trapping larger or smaller animals.

While I have illustrated details of construction and arrangement of parts which I have found to be thoroughly effective in actual practice, yet I do not wish to be limited thereto, as it is obvious that many changes might be made therein without departing from the spirit of the invention as defined in the appended claims.

I claim:—

A trap of the character described comprising a trap body having a trap door in its bottom, a shaft extending through the middle of the trap door upon which it is mounted for rotation, the trap body having an entrance opening adjacent one end of the trap door, spring actuated means for rotating the trap door and including a ratchet wheel having diametrically disposed, outwardly projecting ratchet teeth, latching means normally preventing rotation of the trap door from a horizontal position including a pawl carrying a roller at its extremity and normally disposed in the path of movement of said teeth, means for releasing said latching means including a vertically disposed lever mounted at one end of the trap body and carrying a bait supporting hook at its upper end, the hook being disposed within the interior of the trap body, a horizontally disposed lever pivoted at its middle and connected at one end to the vertically disposed lever, and a link connected to the outer end of the horizontally disposed lever and engaging said pawl whereby upon a pull on the bait the pawl shall be retracted.

In testimony whereof I hereunto affix my signature.

OLIVER H. HARRIS.